United States Patent Office 2,783,264
Patented Feb. 26, 1957

2,783,264

PREPARATION OF NITRILES FROM AMIDES

William J. Klapproth, Jr., Cranford, N. J., assignor to American Cyanamid Company, New York, N. Y., a corporation of Maine No Drawing. Application March 21, 1955,
Serial No. 495,757

4 Claims. (Cl. 260—465)

This invention relates to nitriles. More particularly, it relates to the conversion of amides to nitriles by means of a fusion method.

It is known that amides react with ammonium sulfamate to form nitriles by a reaction involving a condensation with elimination of the amide nitrogen to form an N-ammonium sulfonate derivative of the amide. This derivative on heating forms the nitrile and ammonium acid sulfate.

It is the object of the present invention to supply a process for converting amides to nitriles in a more convenient and economical manner than hitherto possible.

This object is accomplished in a surprisingly straightforward manner. The appropriate amide is heated with a compound selected from the group consisting of diammonium imidodisulfonate and triammonium nitrilotrisulfonate to form a nitrile corresponding to the amide. Resulting nitrile may then be recovered from the reaction mass by any convenient means.

The reaction of the present invention is most surprising, since it does not appear to follow the course expected from prior teaching. When starting with diammonium imidodisulfonate, the expected intermediate would be $RCON(SO_3NH_4)_2$ formed by the reaction

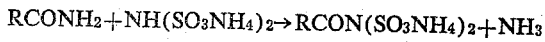

$$RCONH_2 + NH(SO_3NH_4)_2 \rightarrow RCON(SO_3NH_4)_2 + NH_3$$

This reaction would be analogous to that shown to occur when starting with ammonium sulfamate. However, this expected intermediate does not appear able to undergo an analogous reaction to form the nitrile. Hence, the reaction of the amide with diammonium imidodisulfonate to form the nitrile probably involves sulfonation of the amide nitrogen by transfer of a sulfonate radical from the imido nitrogen, rather than the condensation type of reaction known to the prior art. The N-ammonium sulfonate amide derivative then can decompose to the nitrile and ammonium bisulfate. The reactions apparently involved are:

(1)
$$RCONH_2 + NH(SO_3NH_4)_2 \rightarrow RCONHSO_3NH_4 + NH_2SO_3NH_4$$

(2)
$$RCONHSO_3NH_4 \rightarrow RCN + NH_4HSO_4$$

It will be noted that ammonium sulfamate is formed in this reaction. This may react with more amide as taught by the prior art to yield more nitrile. Hence, two mols of amide may be converted to two mols of nitrile using only one mol of diammonium imidodisulfonate.

Triammonium nitrilotrisulfonate reacts similarly, forming diammonium imidodisulfonate and the sulfonated amide. The latter is then converted to the corresponding nitrile as shown above. The diammonium imidodisulfonate can react further to produce the nitrile and one mol of ammonium sulfamate. The ammonium sulfamate will, in turn, react with one mol of the amide to produce one additional mol of nitrile. Thus three mols of amide can be converted to three mols of nitrile by using only one mol of triammonium nitrilotrisulfonate.

The amides which can be converted to nitriles by the process of the present invention are any of the alkyl or aromatic amides. As examples of such amides, there may be mentioned acetamide, acrylamide, propionamide, butyramide, valeramide, caprolamide, caprylamide, capramide, cinnamamide, oleamide and the like. Representative of the aromatic amides, there may be mentioned benzamide, 2-naphthamide, 2-fluorinecarboxamide, 5 - quinolinecarboxamide, 1 - naphthalenebutyramide, and the like.

An amount of amide equivalent to the amount of nitrile desired is mixed with the proper proportion of either diammonium imidodisulfonate or triammonium nitrilotrisulfonate. If the former is used, then the mol ratio of amide to sulfonate is preferably 2 to 1. If the latter is used, the mol ratio of amide to sulfonate is preferably 3 to 1. The mixture of compounds is next heated to the temperature at which the nitrile forms. This temperature will generally be above about 150° C. and preferably from about 175° to about 210° C.

An outstanding advantage of the process of this invention is that diammonium imidodisulfonate and triammonium nitrilotrisulfonate are inexpensive and easily prepared. In this respect they differ from ammonium sulfamate used in the prior art procedure. Both compounds used in the process of the present invention may be prepared simply by contacting $NH_3$ and $SO_3$ in proportions suitable for yielding either the disulfonate or the trisulfonate compound. No further purification of the product is necessary. Ammonium sulfamate, on the other hand, is relatively more difficult and costly to prepare. In addition, only one-half and one-third mol, respectively, of diammonium imidodisulfonate and triammonium nitrilotrisulfonate are required per mol of amide to produce the same amount of nitrile as when starting with ammonium sulfamate. Furthermore, only one-half or one-third as much ammonia is evolved as in the prior ammonium sulfamate process.

The nitrile may readily be recovered from the heated reaction mass. This usually will be done by a simple distillation process either at atmospheric or reduced pressure. Preferably, the mixture of amide and sulfonate will be heated to produce the nitrile, heating being continued at a slightly higher temperature in order to distill the nitrile over. The nitrile may thus be readily separated from the reaction mass almost as fast as it is formed. If it is inconvenient to distill over the nitrile, it may be extracted from the reaction mass by use of a solvent.

Example 1

A mixture of 60.5 parts benzamide (0.5 mol) and 53 parts diammonium imidodisulfonate is heated together in a flask to a temperature of 120° C., at which point the mix melts. Heating is continued to a pot temperature of 198°–210° C., at which temperature benzonitrile distills over at a temperature of 188°–192° C. (uncorrected) in the head. A total of 46.5 parts benzonitrile is recovered for a yield equal to 90.5%.

Example 2

A mixture of 87 parts butyramide (1.0 mol) and 105 parts diammonium imidodisulfonate (0.5 mol) is heated in a flask connected to a small distillation column equipped with condenser and receiver. The mix melts at a temperature of about 100° C. Heating is continued to a temperature of 175°–180° C. 63 parts of butyronitrile are recovered in the receiver for a yield equal to 91.5% based on the butyramide.

Example 3

A mixture of 71.5 parts caprylamide (0.5 mol) and 51 parts triammonium nitrilotrisulfonate (0.167 mol) are heated in a flask. The mix melts above 104° C. Heating is continued, and at pot temperatures up to 205°–210° C. caprylonitrile distills over in an amount of 55 parts for a yield of 88% based on the starting caprylamide.

I claim:

1. A method of producing nitriles from amides which comprises heating an amide selected from the group consisting of alkanoic, alkenoic and aromatic carboxylic acid amides with a compound selected from the group consisting of diammonium imidodisulfonate and triammonium nitrilotrisulfonate to above about 150° C. to form the corresponding nitrile, and recovering said nitrile.

2. A method according to claim 1 wherein said temperature is 175°–210° C.

3. A process according to claim 2 in which the reacting compound is diammonium imidodisulfonate, present in a mol ratio with the amide of about 1:2.

4. A process according to claim 2 in which the reacting compound is triammonium nitrilotrisulfonate, present in a mol ratio with the amide of about 1:3.

References Cited in the file of this patent

UNITED STATES PATENTS

| | | |
|---|---|---|
| 2,567,676 | Marsh | Sept. 11, 1951 |
| 2,567,677 | Marsh | Sept. 11, 1951 |

OTHER REFERENCES

Boivin: Canadian Journal of Research, vol. 28B, pp. 671–75 (1950.)